United States Patent Office 2,818,412
Patented Dec. 31, 1957

2,818,412

ADDUCTS OF THE ETHER OF HOMO-ABIETIC ACID WITH α,β-UNSATURATED ORGANIC POLYBASIC ACIDS

Owen S. Eckhardt and Ismond E. Knapp, Columbia, Miss., assignors to Leach Brothers, Inc., Columbia, Miss., a corporation of Wisconsin No Drawing. Application September 17, 1952
Serial No. 310,138

10 Claims. (Cl. 260—346.6)

Our invention relates to the production of new and useful chemical compounds and reaction products containing the same, particularly maleic anhydride adducts, of the ether of homo-abietic acid. Such novel chemical compounds, and reaction products containing the same, have a number of valuable properties among which is their ability, for example, desirably to modify the surface characteristics of various pigments whereby they improve the flow of printing inks and the dispersibility of various pigments in so-called "steam set" inks.

In general, the novel products of our invention are made by reacting an α,β-unsaturated organic polybasic acid or an ester or anhydride thereof, particularly maleic anhydride, with the ether of homo-abietic acid, or reaction products containing said ether of homo-abietic acid, said reaction being carried out at elevated temperatures and advantageously with vigorous agitation. A temperature in the range of about 175–225 degrees C. is, in general, quite satisfactory, a particularly preferred range being from about 190 to about 200 degrees C. The reaction is usually completed in from one to several hours, the time being dependent, among other things, upon the temperature utilized and the degree of agitation. The maleic anhydride or other α,β-unsaturated organic polybasic acid compound is used in an amount equivalent to about 2 mol for each mol of the ether of homo-abietic acid present although an excess of said anhydride or acid compound is not harmful. On a weight basis, the maleic anhydride or other acid compound is utilized in distinctly minor proportions with respect to the ether of homo-abietic acid. Where the ether of homo-abietic acid is employed as one of the reactants in the form of a crude reaction product, as described hereafter, the maleic anhydride or other acid compound will usually be employed in amounts of the order of about 5% to about 7.5%, by weight, of said crude reaction product.

The maleic anhydride or other acid compound adduct of the ether of homo-abietic acid can be separated from the reaction mixture in which it is produced or the reaction mixture can be used as such. For many purposes, such as those indicated above, excellent results are obtained by employing the reaction mixture. Where, however, it is desired to separate out the adduct of the ether of homo-abietic acid from the reaction mixture, this can readily be done since said adduct and the unreacted materials have radically different solubilities in various hydrocarbon solvents. Thus, to effect said separation, a volume of a heated solvent such as turpentine or hi-flash naphtha is added to the reaction product to make an approximately 50% to 60% solution and said solution is then cooled in any desired manner as, for instance, by circulating it through a conventional water-cooled heat exchanger. The resulting cooled solution is then diluted with from 10 to 20 times its volume of an organic solvent, preferably a relatively low boiling petroleum hydrocarbon solvent such as hexane, heptane, or a naphtha having a somewhat similar distillation range. Under these conditions, the adduct precipitates out, usually in the form of a tan or buff colored finely granular material which is easily recovered by filtration. The precipitate is then washed with fresh solvent and dried. The filtrate can be evaporated to recover the unreacted material therefrom.

Where maleic anhydride is utilized, the adduct therewith of the ether of homo-abietic acid has the following probable structural formula:

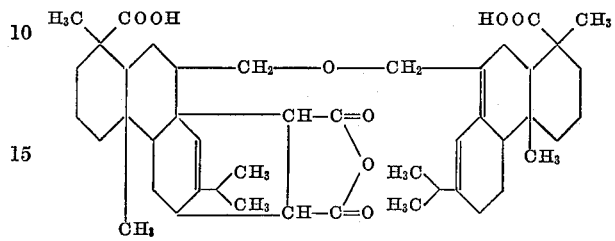

The intermediate ether of homo-abietic acid, which is reacted with the maleic anhydride or other acid compound to produce the novel adducts of our present invention, has a melting point ranging from about 80 degrees C. to about 110 degrees C., depending upon its exact method of preparation and its degree of purification. It has a specific optical rotation $[\alpha]_D$=approximately —10°. It is stable to heat. It is readily soluble in aromatic hydrocarbons such as benzene and toluene, also in methyl alcohol, and turpentine, as well as in chlorinated solvents such as chloroform, carbon tetrachloride and the like. The system of conjugated double bonds, characteristic of the l-abietic acid molecule, appears to be intact in the ether. The molecular weight of the ether of homo-abietic acid (Rast method) compares well with its calculated value of 646. Molecular weight determinations by the Rast method on reaction products containing predominant portions of the intermediate ether of homo-abietic acid have fallen within the range of 560 to 650, depending upon the purity of the reaction product or, in other words, upon its content of the ether of homo-abietic acid. The acid numbers of typical samples of the intermediate ether of homo-abietic acid fall within the range of 171 to 172, thus showing that the carboxyl groups present in l-abietic acid are essentially unchanged in the ether of the homo-abietic acid, it being noted that, in this connection, the calculated acid number of the ether of homo-abietic acid is 173.7.

In the production of the intermediate ether of homo-abietic acid, l-abietic acid, or a suitable source material thereof, containing free l-abietic acid or esters thereof, particularly wood rosin or gum rosin, is initially reacted with formaldehyde (or a material which, during the reaction, releases formaldehyde, as, for example, flake or granular paraformaldehyde), at a temperature in excess of 145 degrees C. and preferably at a temperature of 160 to 180 degrees C. or somewhat higher. In this heating step, water appears to split out during the reaction and is driven off with the concomitant formation of the desired ether of homo-abietic acid. We find it advantageous to utilize, in the first step of the method, approximately 10% of formaldehyde, based on the weight of the l-abietic acid or the l-abietic acid content of the rosin. In general, a percentage of formaldehyde in the range of about 7% to about 10%, by weight, of the l-abietic acid, is quite satisfactory in most cases. When the procedure described above is followed, which represents our particularly preferred practice, the intermediate ether of homo-abietic acid is produced in the form of a reaction product and from which said ether is not separated. Rather, the reaction product, in which said ether has been produced in situ, is itself reacted with the maleic anhydride or like acid compound. In such cases, the final reaction product will contain substantial proportions, usually of the order of at least 25%, by weight, of the adduct of the ether of homo-abietic acid. Such novel reaction products represent a particularly preferred and important embodiment of our invention.

In accordance with this latter aspect of our invention, the reaction products containing the intermediate ether of homo-abietic acid are prepared by reacting a rosin or rosin mixture, containing a substantial proportion of l-abietic acid, that is, not appreciably below and advantageously appreciably in excess of 20%, by weight, with formaldehyde (or material which, during the reaction, releases formaldehyde as, for example, paraformaldehyde), as previously stated, at a temperature of at least 145 degrees C. and, more advantageously, at a temperature of about 160 degrees C. to 180 degrees C., or, if desired, at a still higher temperature up to about 200 degrees C., the reaction being carried out particularly advantageously as described below. Ordinary gum rosin (colophony), wood rosins of various grades such as F and FF, tall oil rosin, rosin extracted from the Western pines such as Ponderosa, and mixtures thereof form suitable source materials. The color grade of the rosin used is not important since good yields of the final maleic anhydride adduct of the ether of homo-abietic acid have been prepared from darker grades of wood rosin such as F wood rosin, as well as from the pale grades such as WG gum rosin.

In the preparation of the intermediate ether of homo-abietic acid in situ, it is advantageous to utilize the formaldehyde in the form of its solid polymer, namely, paraformaldehyde. As it is ordinarily obtained in commerce, paraformaldehyde is a powder and when said powder is added to the molten rosin it tends to float on the surface of the rosin with the result that a large proportion of the paraformaldehyde depolymerizes, at the temperature of the molten rosin, the result being that at least most of the formaldehyde escapes as a gas without reacting with the molten rosin. In order to obtain effective economical operations, the paraformaldehyde should be used in the form of flakes or granules and it should be added slowly to the molten rosin with relatively rapid agitation. The agitator in the reaction vessel should be of the type to draw the paraformaldehyde flakes downwardly into the molten rosin well below the surface thereof so that, as depolymerization takes place, the formaldehyde which is formed bubbles through a considerable depth of the molten rosin and, in so doing, there is sufficient time and adequacy of contact between the formaldehyde and the rosin to obtain adequate and substantial reaction therebetween. It is unnecessary to carry out the reaction under pressure since, under the conditions described, the reaction proceeds smoothly and rapidly at atmospheric pressure.

The proportions of formaldehyde utilized in relation to the rosin are somewhat variable. At least in most cases, the amount of formaldehyde (or paraformaldehyde) should not be appreciably below 4%, by weight, of the l-abietic acid present in the rosin. While the amounts of formaldehyde utilized in the reaction may go as high as about 10%, the best results are usually obtained with about 3% to about 9%, and, more particularly, with about 4% to about 8%, by weight, of the l-abietic acid content of the rosin. With the use of lesser proportions, say as low as 0.5% of formaldehyde, the amount of ether of homo-abietic acid produced is correspondingly decreased and, therefore, the higher proportions of formaldehyde should be employed.

As we have indicated above, our especially preferred adducts are made by reacting the ether of homo-abietic acid with maleic anhydride. In the broader phases of our invention, in place of maleic anhydride we can use other $\alpha,\beta$-unsaturated organic polybasic, particularly dibasic, acid compounds such as the free acids, their anhydrides, and their esters. Typical examples of such acid compounds are maleic acid, fumaric acid, diethyl maleate, diallyl maleate, citraconic acid, and methyl maleic anhydride. Of outstanding utility, however, are the adducts prepared with maleic anhydride and such represent the most important embodiment of our invention.

It should be understood that we claim no novelty broadly in the production of reaction products of rosin or rosin acids or derivatives of rosin with formaldehyde, such products generally having long been known. As heretofore prepared, they have various properties and characteristics which are in no way related to those products which are made in accordance with our present invention.

We are also aware that it has heretofore been suggested to produce synthetic resins by the conjoint reaction, under certain conditions, of unsaturated rosin acids or esters thereof with formaldehyde and with $\alpha,\beta$-unsaturated polycarboxylic acids or anhydrides thereof such as maleic anhydride, and we make no claims thereto. Such heretofore known conjoint condensation products, disclosed, for example, in Patent No. 2,311,781, are prepared by dissolving rosin or the like in benzene, adding an aqueous solution of formaldehyde such as formalin thereto, and then adding maleic anhydride, the resulting conjoint mixture being refluxed at temperatures of the order of 80 to 90 degrees C. for several hours. After completion of such reaction, the mixture is evaporated at elevated temperatures, of the order of about 240 degrees C., at relatively low pressures, for example, of the order of 15 mm. Hg, to remove unreacted materials as well as water and organic solvent. Under such conditions, the formaldehyde reacts with the rosin to form esterifiable hydroxyl groups and the resulting alcohol is esterified by the maleic acid present in the reaction mixture to form esters. The final reaction products are characterized by acid numbers falling within the range of about 160 to about 175.

We have found, in accordance with our invention, that when a rosin or a rosin product containing a substantial proportion of l-abietic acid is initially reacted with formaldehyde, or a material which, under the conditions of the reaction, releases formaldehyde, and such reaction is carried out under the conditions heretofore specified and illustrated by the examples hereafter set forth, intermediate products comprising ethers of homo-abietic acid are produced. When such intermediate products, or reaction mixtures comprising the same, are subsequently reacted with an $\alpha,\beta$-unsaturated polybasic acid, particularly maleic anhydride, the final products which result, which are adducts, are sharply distinguishable from those which are produced by following the procedures described, for example, in the aforementioned Patent No. 2,311,781. Our novel reaction products, for example, are characterized by very substantially higher acid numbers than are obtainable by practicing the processes described in the aforementioned Patent No. 2,311,781. Thus, for example, our novel reaction products or final adducts have acid numbers ranging from approximately 190 to 270 which are materially higher than those obtainable following the procedures described in Patent No. 2,311,781. Furthermore, various of the physical and chemical properties of the resulting products of our present invention are readily distinguishable from those produced in accordance with heretofore known teachings such as those described above, and various of the uses to which said products can be put are likewise considerably different.

It may also be observed that, when the teachings of our present invention are followed, the mechanism of the reactions is radically different from that disclosed, for example, in the aforesaid Patent No. 2,311,781. In our invention, the action of the formaldehyde upon the rosin or l-abietic acid, when the process is carried out for the production of the intermediate product as described by us herein, produces an ether of homo-abietic acid which has no esterifiable hydroxyl groups. Hence, when said intermediate product is reacted with maleic anhydride, esterification does not take place because there are no esterifiable hydroxyl groups to be reacted with the maleic anhydride.

Rather, the maleic anhydride, when utilized in accordance with our invention, reacts only at the double bonds of the abietic acid in order to form the adduct. This is in sharp contrast to the type of reaction which occurs in accordance with prior art teachings wherein, initially, as a result of the conjoint reaction of the rosin, formaldehyde, and maleic anhydride, alcohol formation and esterification of the resulting alcohol by the maleic acid takes place.

The following examples, in which the parts listed are by weight, are illustrative of the practice of our invention. It will be understood that such examples are in nowise intended to be limitative of the full scope of our invention since certain changes can be made with respect to selection of source materials of 1-abietic acid; materials which, under the conditions of the reaction, releases formaldehyde; proportions of reactants, temperatures, times of heating, and the like, without departing from the spirit of our invention in the light of the guiding principles which we disclose herein.

Example 1

(a) 50 parts of crystalline resin acids (M. P. 165–168° C., Acid No. 185, $[\alpha]_D^{-36°}$) derived from rosin and containing approximately 75% of 1-abietic acid, were melted under a blanket of $CO_2$ in a flask with a stirrer, thermometer, gas inlet pipe, vent, and chemical inlet. The temperature was held between 180 and 190 degrees C. and 5 parts, by weight, of paraformaldehyde flakes were added in small increments with rapid agitation. Stirring was maintained for 30 minutes after the final addition of the paraformaldehyde. The resulting product comprised the ether of homo-abietic acid.

(b) To the reaction product of part (a), 6.5 parts, by weight, of freshly distilled maleic anhydride were added in small increments and the temperature was maintained between 180 and 200 degrees C. for 3 hours. The temperature was then dropped to 130 degrees C. and toluene was added to form a solution containing 50% solids. This solution was then cooled to room temperature and poured into 3 liters of naphtha with vigorous agitation. A light buff-colored precipitate settled out which, after filtering, washing with naphtha and drying, showed a melting point of 170–172 degrees C. and an acid number of 270. Analysis showed it to comprise the maleic anhydride adduct of the ether of homo-abietic acid.

Example 2

(a) 150 parts of F wood rosin (containing less than 1% naphtha-soluble matter) were heated to 165 degrees C. and 6 parts of paraformaldehyde flakes were added slowly during 1 hour with good agitation while raising the temperature to 175 degrees C. The reaction mixture was then heated for an additional hour at 190 degrees C.

(b) To the reaction product of part (a), 10 parts of maleic anhydride were added in small increments, with stirring, during 45 minutes at a temperature of 190–200 degrees C. and then the batch was stirred an additional hour at 200 degrees C. Then 200 parts of turpentine were added, the resulting solution was cooled to 40 degrees C., and was added to 4000 parts of hexane with good agitation. A voluminous tan precipitate immediately formed and was filtered off. It was washed with additional hexane and dried, yielding 70 parts of an almost white powder having a melting point of 167 degrees C. and an acid number of 209. Analysis showed it to comprise the maleic anhydride adduct of the ether of homo-abietic acid.

Example 3

(a) 150 grams of wood rosin from Oregon, obtained by extracting Ponderosa pine stump wood with naphtha, were melted in a vessel equipped with an efficient agitator, and the mass was heated to 160 degrees C. Then 4.5 grams of paraformaldehyde flakes were added slowly during about 1 hour while the temperature was held at about 165 degrees C. Stirring was continued for another hour during which time the temperature was raised to 175 degrees C. The reaction product showed no marked change in color or acid number from the original untreated rosin. It showed a softening point of 74 degrees C.

(b) To the reaction mixture of part (a), at a temperature of about 190 degrees C., 10 parts of maleic anhydride were added slowly with stirring during 1 hour while raising the temperature to 200 degrees C. After an additional hour at 200 degrees C., with stirring, 150 parts of hi-flash naphtha were added and the resulting solution was cooled to 40 degrees C. It was then poured into 3500 parts of naphtha with good agitation. A voluminous buff-colored precipitate came down, settling rapidly as soon as the agitation was stopped. The supernatant solution was then decanted, the precipitate was filtered off and washed with fresh naphtha, and then dried. A yield was obtained of 70 parts of a tan powder having a melting point of 165 degrees C. (Fisher-John electric block) and an acid number of 200 when titrated with aqueous KOH in a toluene-alcohol solution. Analysis showed it to comprise the maleic anhydride adduct of the ether of homo-abietic acid.

Example 4

(a) 2000 parts of WW gum rosin, having a melting point of 80 degrees C. (Ring and Ball) and an acid number of 166, were melted in a vessel similar to that described in Example 1. The rosin was heated to 170 degrees C. and then 60 parts of paraformaldehyde flakes were added slowly during a period of 2 hours while the batch was stirred vigorously and the temperature was held at 170 degrees C. After the paraformaldehyde was all in, stirring was continued for 1 hour at 170 degrees C. and then the batch was removed. The reaction product showed a melting point of 86 degrees C. (Ring and Ball) and an acid number of 162.

(b) To the reaction product of part (a), 125 parts of maleic anhydride were added in small increments, with stirring, during 45 minutes at a temperature of 190–200 degrees C. and then the batch was stirred an additional hour at 200 degrees C. Then 2500 parts of turpentine were added, the resulting solution was cooled to 40 degrees C., and was added to 40,000 parts of hexane with good agitation. A voluminous tan precipitate immediately formed and was filtered off. It was washed with additional hexane and dried, yielding an almost white powder having a melting point of about 167 degrees C. and an acid number of about 210. Analysis showed it to comprise the maleic anhydride adduct of the ether of homo-abietic acid.

Example 5

200 parts of FF wood rosin (melting point 71 degrees C.) were heated to 165 degrees C. and 5 parts of paraformaldehyde flakes were added slowly during 1 hour with vigorous agitation while raising the temperature to 175 degrees C. During the second hour the temperature was raised to 190 degrees C. A sample of the reaction product showed a melting point of 88 degrees C. While holding the temperature at 190–200 degrees C., 12.5 parts of maleic anhydride were added slowly during 45 minutes and then the batch was stirred an additional hour at 200 degrees C. Analysis showed that under these conditions the maleic anhydride adduct of the ether of homo-abietic acid had been formed in situ. It was not isolated. The final product was a modified rosin having a melting point of 124 degrees C. and an acid number of 190.

In the foregoing examples, the process may be discontinued after the step of reacting with the maleic anhydride. In such cases, the final reaction product will comprise a modified rosin containing from about 25% to about 40% of the maleic anhydride adduct of the ether of homo-abietic acid. Such products, as we have previously stated, are valuable for the same purposes as the substantially pure adducts.

Where reference is made in the claims to the adducts of the ether of homo-abietic acid, it will be understood that it is intended to encompass said adducts whether in the form of a pure or substantially pure compound or in the form of a reaction product containing a proportion, particularly a substantial proportion, of said adduct unless the context in any claim expressly indicates otherwise. Where reference is made in the claims to α,β-unsaturated organic polybasic acid compound, it will be understood to include the free acid, the anhydride of said acid, and esters of said acid.

This application is a continuation-in-part of our prior application Serial No. 247,196, filed September 18, 1951, now abandoned.

What we claim as new and desire to protect by Letters Patent of the United States is:

1. An adduct of the ether of homo-abietic acid with an α,β-unsaturated unsubstituted organic polycarboxylic acid compound, said adduct having an acid number between 190 and 270.

2. A new chemical compound having the structural formula

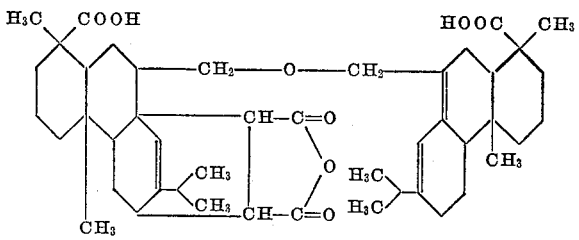

3. A formaldehyde-modified l-abietic acid product containing at least 25%, by weight, of an adduct of the ether of homo-abietic acid with an α,β-unsaturated unsubstituted organic polycarboxylic acid compound, said product having an acid number between 190 and 270.

4. A formaldehyde-modified rosin containing at least 25%, by weight, of the maleic anhydride adduct of the ether of homo-abietic acid, said formaldehyde-modified rosin having an acid number between 190 and 270.

5. The product of the reaction of (a) an α,β-unsaturated unsubstituted organic polycarboxylic acid compound with (b) the independently produced reaction product of a l-abietic acid product with from about 4% to about 10% of formaldehyde, based on the weight of the l-abietic acid content of said l-abietic acid product, said reaction product of (a) and (b) containing at least 25%, by weight, of an adduct of the ether of homo-abietic acid with said α,β-unsaturated unsubstituted organic polycarboxylic acid compound, said product having an acid number between 190 and 270.

6. The product of the reaction of (a) about 5 to about 7.5 parts by weight of maleic anhydride with (b) 100 parts by weight of the independently produced reaction product of a rosin with from about 4% to about 10% of formaldehyde, based on the weight of the l-abietic acid content of said rosin, said reaction product of (a) and (b) containing at least 25%, by weight, of the maleic anhydride adduct of the ether of homo-abietic acid, said product having an acid number between 190 and 270.

7. The method of making new and useful adducts which comprises providing (a) a reaction product of l-abietic acid product with several percent of formaldehyde, based on the weight of the l-abietic acid content of said l-abietic acid product, said reaction product having been produced at a temperature in excess of 145 degrees C. and comprising an ether of homo-abietic acid, said ether having a conjugated double bond system characteristic of l-abietic acid, and (b) then reacting the aforesaid reaction product with an α,β-unsaturated unsubstituted organic polycarboxylic acid compound in amounts of several percent, by weight of said (a) reaction product, at a temperature in the range of about 175 degrees C. to about 225 degrees C., whereby to produce an adduct having an acid number between 190 and 270.

8. The method of making new and useful adducts which comprises providing (a) a reaction product of a rosin with about 4% to about 10% of paraformaldehyde, based on the weight of the l-abietic acid content of said rosin, said reaction product having been produced at a temperature between about 160 degrees C. and about 200 degrees C. and comprising an ether of homo-abietic acid, said ether having a conjugated double bond system characteristic of l-abietic acid, and (b) then reacting the aforesaid (a) reaction product with maleic anhydride in amounts of from about 5% to about 7.5%, by weight of said rosin-paraformaldehyde reaction product, at a temperature in the range of about 175 degrees C. to about 225 degrees C., whereby to produce an adduct having an acid number between 190 and 270.

9. The method of making new and useful adducts which comprises (a) reacting a l-abietic acid product with from about 4% to about 10% of formaldehyde, based on the weight of the l-abietic acid content of said l-abietic acid product, at a temperature between about 145 degrees C. and about 200 degrees C. whereby to produce a reaction product comprising an ether of homo-abietic acid, said ether having a conjugated double bond system characteristic of l-abietic acid, and (b) then reacting the aforesaid (a) reaction product with an α,β-unsaturated unsubstituted organic polycarboxylic acid compound in amounts of from about 5% to about 7.5%, by weight of said (a) reaction product, at a temperature in the range of about 175 degrees C. to about 255 degrees C., whereby to produce an adduct having an acid number between 190 and 270.

10. The method of making new and useful adducts which comprises (a) reacting a rosin with from about 4% to about 10% of paraformaldehyde, based on the weight of the l-abietic acid content of said rosin, at a temperature between about 160 degrees C. and about 200 degrees C. whereby to produce a reaction product comprising an ether of homo-abietic acid, said ether having a conjugated double bond system characteristic of l-abietic acid, and (b) then reacting the aforesaid reaction product with maleic anhydride in amounts of from about 5% to about 7.5%, by weight of said rosin-paraformaldehyde reaction product, at a temperature in the range of about 175 degrees C. to about 255 degrees C., whereby to produce an adduct having an acid number between 190 and 270.

References Cited in the file of this patent
UNITED STATES PATENTS 2,311,781 Scrutchfield Feb. 23, 1943
2,572,071 St. Clair Oct. 23, 1951